Sept. 8, 1931.  A. B. CADMAN  1,822,564
BRAKE
Filed March 5, 1928
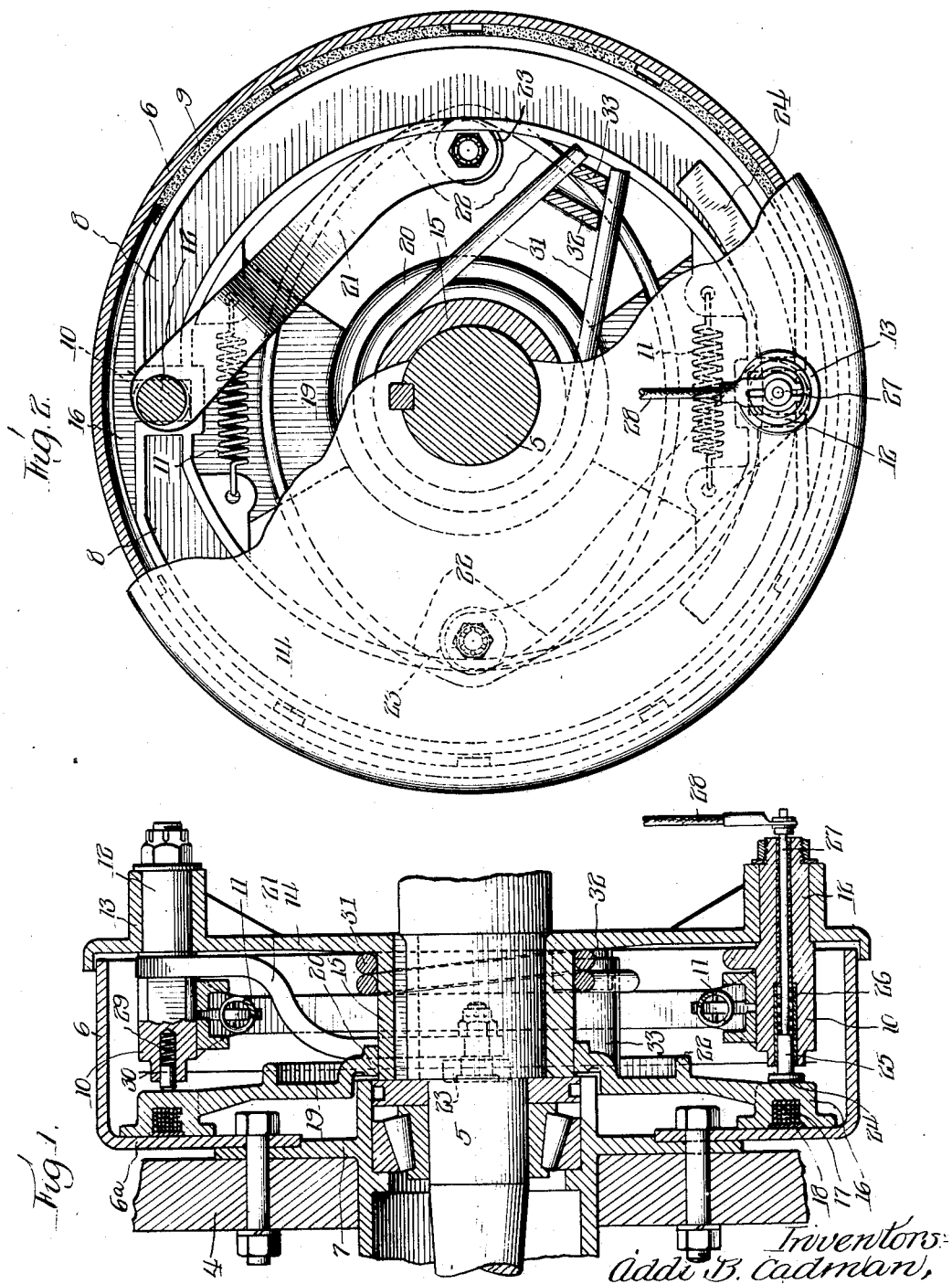

Patented Sept. 8, 1931

1,822,564

UNITED STATES PATENT OFFICE

ADDI BENJAMIN CADMAN, OF BELOIT, WISCONSIN, ASSIGNOR TO WARNER ELECTRIC BRAKE CORPORATION, OF SOUTH BELOIT, ILLINOIS, A CORPORATION OF ILLINOIS

BRAKE

Application filed March 5, 1928. Serial No. 259,031.

This invention relates to friction brakes and more particularly brakes of the so-called momentum type.

Brakes of this class as applied to a vehicle generally include a pair of coacting friction elements which, when brought into gripping engagement, derive an actuating force from the motion or momentum of the vehicle whose motion is to be controlled, this force being augmented mechanically and applied to a friction brake associated with the wheels or other part of the vehicle.

One object of the present invention is to provide an improved brake of the above class wherein the operating parts of the force-augmenting connection are arranged in a novel manner within the periphery of a drum, the brake unit as a whole being completely enclosed and compact in structural arrangement so as to be particularly adapted for association with a vehicle wheel.

Another object of the invention is to provide a momentum brake of the internally expansible type having a new and improved force-multiplying connection through which the brake-actuating force is transmitted from the driven element of the friction operator to the brake proper.

Other objects and advantages of the invention will become apparent from the following detailed description taken in connection with the accompanying drawings in which:

Figure 1 is a fragmentary view in vertical central section of a vehicle wheel equipped with a brake embodying the features of the present invention.

Fig. 2 is an elevational view of the brake with a portion of the casing structure cut away to show the internal arrangement of the operating parts.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In the exemplary form illustrated in the drawings, the invention is embodied in a brake for a vehicle wheel 4 mounted through suitable bearings on a dead or stationary axle 5. The motion of the wheel is intended to be controlled by a friction brake of the expansible type including a drum 6 suitably mounted on the inner side of the wheel as by bolting the flanged end $6^a$ of the drum against the wheel hub 7. Mounted within the drum is a braking means having adjacent separable end portions near the periphery of the drum, this means being illustrated herein as a pair of segmental shoes 8 arranged in end-to-end relation. Each shoe has a covering 9 preferably composed of heat and wear resisting friction material.

As a means for expanding the braking means within the drum, two cam blocks 10 are disposed between the adjacent ends of the shoes and provided with flattened sides, the ends of which operate to spread the shoes apart upon oscillation of the cams in either direction from their normal brake-released position. Springs 11 serve to contract the shoes within the drum.

The cam blocks 10 are rigid with the inner ends of rock shafts 12 journaled in bearing bosses 13 preferably formed externally of a member 14 which forms with the drum a closed protecting casing. This member may be held stationary as by keying an inwardly extending hub portion 15 thereon to the axle 5. Thus the shafts 12 and the cam blocks serve to hold the brake shoes against rotation within the drum and at the same time allow for free expansion thereof.

The means for deriving the force which actuates the brake shoes comprises two coacting friction elements adapted to be brought into gripping engagement by the energization of a powerful electromagnet. One of these elements rotates during motion of the vehicle and in the present instance comprises the outermost portion of the drum flange $6^a$ which presents an inwardly facing friction surface and forms the armature for the magnet constituting the other friction element. This magnet is also annular in form and comprises a ring 16 of magnetic material presenting a flat friction face having a groove therein in which is disposed an annular winding 17. The outer portions of the friction face of the ring constitute magnetic poles and are separated by a non-magnetic ring 18.

To support the ring opposite the flange for oscillatory movement and also for engagement with the flange by a force acting in an axial direction, the ring 16 is formed integral with the outer ends of two radially extending arms 19 integrally formed on a hub 20 which is rotatably mounted on the hub portion 15 of the closure member 14.

The actuating force derived through the frictional gripping engagement of the ring 16 and the drum flange 6ª when the winding 17 is energized is magnified and applied to each of the expanding cams 10. To this end, a substantially straight crank arm 21 is fixed to each rock shaft 12 adjacent the cam thereon and is disposed in such angular position relative to the cam as to follow generally the internal contour of the drum when in brake-released position (Fig. 2). That is to say, the crank arms 21 extend in a non-radial direction making an acute angle with a diameter through the drum and crank axes. Preferably, the arms 21 are disposed in parallel relation with their free ends located on diametrically opposite sides of the axle and near the periphery of the drum. The free ends of the cranks are bent outwardly towards the closed end of the drum to permit convenient actuation thereof.

Means operated by the angular movement of the magnet ring 16 is provided for swinging the cranks 21 in the same direction during each application of the brake regardless of the direction of motion of the ring. This means, in the form herein illustrated, comprises a pair of double cams which provide two converging surfaces 22 engaging a roller 23 on the free end of one of the crank arms 21. The surfaces 22 are provided by ribs formed integral with the hub 20 and the arms 19. In the present instance, the ribs converge outwardly and thus are adapted to swing the crank arms inwardly toward the axle in the angular movement of the magnet ring in either direction from its normal brake-released position. Owing to the steepness of the cam surfaces, an extremely small angular movement of the magnet ring is required to apply the brake shoes to the drum. Bending of the parts due to a wedging action of the cam surfaces is therefore avoided.

The magnet winding is intended to be energized through an insulated electrical circuit including a storage battery or other source of electrical energy. For this purpose, one terminal end of the winding 17 is grounded to the ring 16 while the other terminal end is electrically connected to an insulated contact strip 24. A brush 25 in an insulated bushing extending through one rock shaft 10 is continuously pressed against the strip by a spring 26. The shank 27 provides a stationary anchoring point for a flexible conductor 28 leading to the storage battery.

The spring 26 together with an oppositely positioned spring 29 acting on a pin 30 serves to urge the magnet ring resiliently into intimate mechanical contact with the surface of the driving friction element thereby maintaining at all times a substantially closed circuit for the flow of magnetic flux produced by the energization of the magnet.

To normally maintain the magnet ring and the cam surfaces 22 in brake-released position, a spring 31 is provided. This spring is coiled about the hub 15 and has two arms which bear against opposite sides of lugs 32 and 33, the former being on the closure plate 14 and the latter being formed integral with the magnet supporting structure.

It will be apparent that the structure thus provided constitutes a compact brake unit all the operating parts of which are entirely enclosed within the drum and the closure member therefor, thus being protected from the collection of mud and ice thereon when the brake is used on a motor vehicle wheel. By arranging the actuating cranks so that they always move in one direction regardless of the direction of motion of the vehicle at the time the friction elements grip each other, the available space around the axle and within the periphery of the drum is efficiently utilized. This is particularly advantageous in the adaptation of the brake to front or steering wheels of vehicles wherein the annular space within the drum periphery is reduced materially in its radial width by the location of the steering knuckle closely adjacent the plane of rotation of the wheel as is done in standard practice. By interposing a force-augmenting means such as the cranks 21 between the cam surfaces 22 and the shoes, the shape of the cam surfaces may be relatively steep thereby providing the proper degree of force multiplication between the magnet and the shoes. Therefore, the brake may be set in a small fraction of rotation of the drum.

To apply the brake, it is merely necessary to cause a current of a strength proportional to the braking action desired to flow through the magnet winding. The magnetic flux thus produced causes attraction of the friction elements by a force acting axially thereof, the driven element or magnet being drawn into firm gripping engagement with the drum flange 6ª. Being thus attached to the drum, the ring 16 is carried forwardly by the momentum of the vehicle and thereby shifts the cam surfaces 22 angularly. The two surfaces then cooperating with the rollers 23 serve to swing the crank arms 21 inwardly thereby oscillating the cams 10 which expand the shoes against the drum. Such angular movement of the cam surfaces continues only until the normal clearance is taken up. The reaction on the shoes thereafter overcomes the frictional force derived through the engagement of the magnetic elements causing frictional slippage therebetween. The brake remains set until the magnet is deenergized whereupon the arm of the spring 31 which was extended during setting of the brake operates to restore the magnet and the cam surfaces 22 to brake-released position. This allows the contractile springs 11 acting on the cams 10 to move the crank arms 21 outwardly to normal position.

I claim as my invention:

1. A brake of the momentum type comprising, in combination, a rotatable drum, expansible braking means within said drum providing adjacent separable end portions, a cam associated with said end portions and adapted to expand said braking means upon oscillation in either direction from a normal brake-released position, a crank arm rigid with said cam and disposed within the circumference of said drum, a pair of annularly arranged coacting friction elements, one carried by said drum, the other being mounted for oscillatory movement, said elements being adapted for frictional gripping engagement by a force acting axially thereof, and means movable with said oscillatory movement and providing a pair of converging cam surfaces operatively associated with the free end of said crank arm and positioned to operate said crank arm upon movement of said oscillatory element in opposite directions.

2. A brake of the momentum type comprising, in combination, a rotatable drum, expansible braking means within said drum providing adjacent separable end portions, a cam associated with said end portions and adapted to expand said braking means upon oscillation in either direction from a normal brake-released position, a crank arm rigid with said cam and disposed when in brake-released position so as to make an acute angle with a diameter through the drum and cam axes, a pair of coacting friction elements of annular form, one rotatably mounted on said drum, the other being mounted for oscillatory movement, means for causing varying degrees of gripping engagement between said elements, and means movable with said oscillatory element and operable on said crank arm to move the arm in the same direction to expand said braking means regardless of the direction of motion of said oscillatory element when gripping said rotatable element.

3. A brake of the momentum type comprising, in combination, a rotatable drum, expansible braking means within said drum providing adjacent separable end portions, a cam associated with said end portions and adapted to expand said braking means upon oscillation in either direction from a normal brake-released position, a crank arm rigid with said cam and disposed when in brake-released position so as to make an acute angle with a diameter through the drum and cam axes, a pair of coacting friction elements of annular form disposed within the drum structure, one being rotatable with said drum, the other being mounted for oscillatory movement, means for causing varying degrees of gripping engagement between said elements, and means movable with said oscillatory element and operable on the free end of said crank arm to actuate the same and thereby expand said braking means.

4. A brake of the momentum type comprising, in combination, a rotatable drum, expansible braking means within said drum providing adjacent separable end portions, expanding means associated with said adjacent end portions, a pair of annularly arranged friction elements, one rotatable with said drum, the other being mounted for oscillatory movement in either direction from a normal brake-released position, an electromagnetic winding carried by one of said elements and adapted when energized to produce a force of magnetic attraction acting axially of said elements whereby to cause gripping engagement of the elements, means rigid with said oscillatory element carrying two converging cam surfaces disposed within the circumference of the oscillatory element, and means operatively connecting said cam surfaces with said expanding means so that the latter will be actuated in the same direction by different cam surfaces upon movement of said oscillatory element in opposite directions.

5. A brake of the momentum type comprising, in combination, a rotatable drum, expansible braking means within said drum having adjacent separable end portions, a pair of annular friction elements of a diameter approximately that of said drum and arranged coaxially thereof, one of said elements being rotatable with the drum, the other being mounted for oscillatory movement, means operable to produce variable degrees of gripping engagement between said elements by a force acting axially thereof, a pair of cam members having converging surfaces movable with said oscillatory element, and a force-augmenting mechanism interposed between said cam surfaces and the end portions of said braking means and operable to spread said end portions by the action of one of said cams when said oscillatory element moves in one direction and by the action of said other cam when the oscillatory element moves in the opposite direction.

6. A brake of the momentum type comprising, in combination, a rotatable drum, expansible braking means within said drum having adjacent separable end portions, an expanding cam associated with said end portions, and a friction operator for oscillating said cam comprising a crank arm rigid with said expanding cam and disposed wholly within the confines of said drum, a pair of coacting friction elements, one rotatable with said drum, means movable with said other element and providing a pair of cam surfaces operable respectively on the free end of said crank arm during the angular movement of said last mentioned element through a small fraction of one revolution in opposite directions.

7. A brake of the momentum type comprising, in combination, a rotatable drum, a stationary member cooperating with said drum to provide a closed casing, braking means within said drum, expanding means for said braking means including a crank arm disposed within the circumference defined by said drum and arranged for oscillation about a fixed axis adjacent the periphery of said drum, a pair of coacting friction elements, one rotating with said drum, the other being arranged for limited angular movement when engaged by said rotating element, and means mounted within said casing providing a pair of converging cam surfaces operable respectively on the free end of said crank arm as said driven element moves in opposite directions.

8. A brake of the momentum type comprising, in combination, a rotatable drum, expansible braking means mounted for engagement with the internal peripheral surface of said drum, expanding means for said braking means, a pair of friction elements, one rotatable with said drum, the other being mounted for oscillatory movement, means operable to effect varying degrees of frictional gripping engagement between said elements, and a force-augmenting mechanism between said oscillatory element and said expanding means including a crank arm mounted on an axis adjacent the periphery of the drum and positioned within the circumference of the drum so as to follow generally the internal contour of the drum.

9. A brake of the momentum type comprising, in combination, a rotatable drum, expansible braking means within the drum, a pair of coacting friction elements, one rotatable with the drum, the other being mounted for oscillatory movement, means operable to effect varying degrees of gripping engagement between said elements, and a mechanism connected to said oscillatory element and operable to transmit the frictional force derived through such gripping engagement to said braking means with increased mechanical advantage whereby to expand said braking means, said connection including a crank arm mounted for movement within the circumference of the drum and following generally the internal contour of the drum, and two converging cam surfaces acting respectively on the free end of said crank in the oscillatory movement of said elements in opposite directions.

10. A momentum brake for a vehicle wheel having, in combination, a drum secured to said wheel, expansible braking means within said drum having adjacent separable end portions, an oscillatory expanding cam associated with said end portions for spreading the same apart, means providing an annular friction surface rotatable with the drum and disposed within the drum structure, an annular friction element mounted within the drum structure opposite said surface and adapted to be urged into axial gripping engagement therewith with varying degrees of pressure, and a force augmenting mechanism interposed between said element and said expanding cam including a crank arm rigid with the cam and disposed in a non-radial position when the brake is released.

11. A momentum brake for a vehicle wheel having, in combination, a drum carried by the wheel and providing an internal cylindrical surface, expansible braking means extending around said surface and having adjacent separable end portions, an oscillatory expanding cam associated with said end portions for spreading the same apart, means providing an annular friction surface rotatable with said drum and of a diameter substantially approximating that of said cylindrical surface, a friction ring of a diameter corresponding to said annular surface and mounted within the drum structure for axial engagement with said annular surface, and force augmenting means disposed wholly within the drum structure and adapted to receive an actuating force from said ring and to apply the augmented force to said expanding cam.

12. A momentum brake for a vehicle wheel having, in combination, a drum carried by the wheel and providing an internal cylindrical surface, expansible braking means extending around said surface and having adjacent separable end portions, an oscillatory expanding cam associated with said end portions for spreading the same apart, means providing an annular friction surface rotatable with said drum and of a diameter substantially approximating that of said cylindrical surface, a friction ring of a diameter corresponding to said annular surface and mounted within the drum structure for axial engagement with said annular surface, and a force augmenting mechanism between said element and said cam including a crank arm rigid with said expanding cam and cam means rigid with said ring and operable on the free end of said crank arm to move the arm in the same direction during the movement of said ring in either direction away from brake-released position.

13. A momentum brake for a vehicle wheel having, in combination, a drum carried by the wheel and providing an internal cylindrical surface, expansible braking means extending around said surface and having adjacent separable end portions, an oscillatory expanding cam associated with said end portions for spreading the same apart, means providing an annular friction surface rotatable with said drum and of a diameter substantially approximating that of said cylindrical surface, a friction ring of a diameter corresponding to said annular surface and mounted within the drum structure for axial engagement with said annular surface, and force-augmenting means between said ring and said cam including a crank arm movable with the expanding cam and a second cam rigid with and disposed internally of said ring and arranged to act on the free end of said crank arm.

In testimony whereof, I have hereunto affixed my signature.

ADDI BENJAMIN CADMAN.